(12) United States Patent
Robinson et al.

(10) Patent No.: US 6,375,451 B1
(45) Date of Patent: Apr. 23, 2002

(54) TAPE CASTING MACHINE WITH PROFILED DOCTOR BLADE

(75) Inventors: Klaus Robinson, Port Hueneme; Anna Lackner, Calabasas; Elena Sherman, Culver City, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/645,101

(22) Filed: Aug. 23, 2000

(51) Int. Cl.[7] ................................................ B29C 35/10
(52) U.S. Cl. ........................ 425/223; 425/224; 264/212; 264/213
(58) Field of Search ................................. 425/223, 224; 264/212, 213; 118/413

(56) References Cited

U.S. PATENT DOCUMENTS

| | | | | |
|---|---|---|---|---|
| 4,145,173 A | * | 3/1979 | Pelzer et al. ................. | 425/224 |
| 4,283,363 A | * | 8/1981 | Boudenant et al. ...... | 264/172.19 |
| 5,272,132 A | * | 12/1993 | Gyorgy et al. ............. | 505/430 |
| 6,251,330 B1 | * | 6/2001 | Johnard et al. ............. | 264/462 |

* cited by examiner

*Primary Examiner*—Nam Nguyen
*Assistant Examiner*—Joseph S Del Sole

(57) ABSTRACT

A tape casting machine has a casting base with a feed location lying generally in a horizontal plane, and a casting head positioned to dispense a slurry onto the casting base. The casting base and the casting head are movable relative to each other. The casting head includes a reservoir containing the slurry, and a doctor blade having a lower leading margin contacting the slurry in the reservoir and disposed adjacent to but not contacting the casting base. The slurry exits from the reservoir to the feed location of the casting base between the lower leading margin of the doctor blade and the casting base to form a cast tape. The lower trailing margin of the doctor blade has a curvature in the horizontal plane and/or a vertical plane.

16 Claims, 5 Drawing Sheets

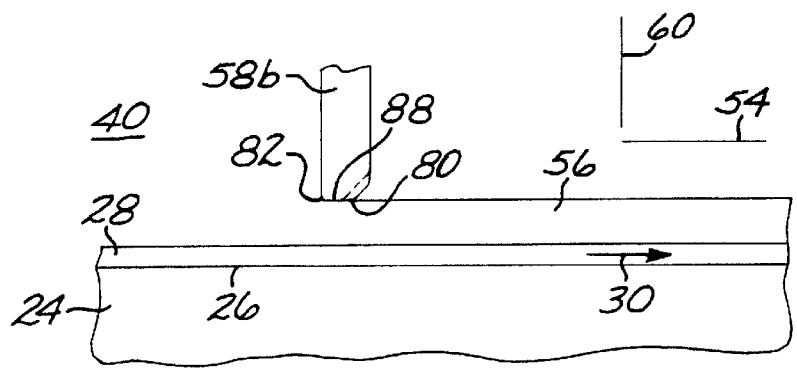
FIG. 6
FIG. 7
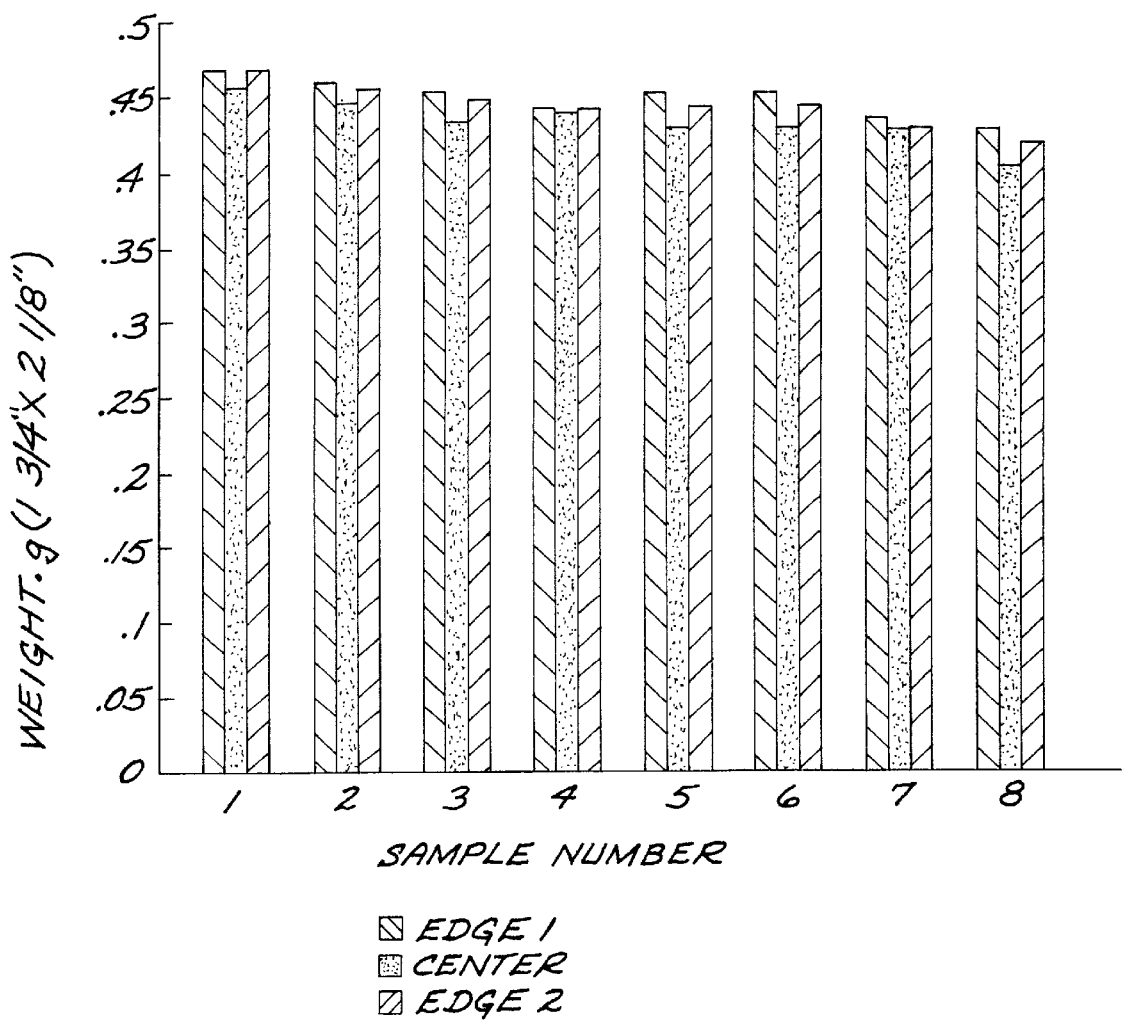

TAPE CASTING MACHINE WITH PROFILED DOCTOR BLADE

This invention relates to tape casting, and, more particularly, to an apparatus that produces a highly uniform cast tape.

BACKGROUND OF THE INVENTION

Tape casting is a technique used to prepare thin films of polymeric materials from slurries or from melts. The process is conceptually straightforward. A casting head includes a reservoir which contains a flowable material to be cast. A carrier film is transported horizontally past the bottom of the reservoir. Some of the flowable material to be cast flows with the carrier film and thence out of the reservoir. The thickness of the cast material on the carrier film is governed by the position of a portion of the wall of the reservoir, termed a "doctor blade". The doctor blade is vertically movable with a micrometer adjustment, to set the height of the opening between the bottom of the doctor blade and the top of the carrier film. The flowable material flows through this opening, whose vertical dimension determines the thickness of the cast material on the carrier film. After the carrier film and the flowable material cast onto it leave the casting head, they are heated gently to evaporate solvents and carriers from the cast material, so that it hardens into the cast tape product.

For some applications, the final cast tape must have an extremely uniform material density across the entire transverse width of the cast tape. That is, the density of a sample of the final product taken from the transverse center of the cast tape must be as nearly identical as possible to the density of a sample taken from the transverse edge of the cast tape. With existing tape casting machines, it is difficult to achieve a uniformity of density of better than about 5 percent for moderately wide tapes. For example, the weight of equal-sized samples taken from the transverse center of a 13-inch wide tape is typically about 5 percent less than that of samples taken near the transverse edge of the tape.

There is a need for an improved approach to tape casting that achieves improved uniformity of the density of the cast tape. The present invention fulfills this need, and further provides related advantages.

SUMMARY OF THE INVENTION

The present invention provides a tape casting machine and a method for its use. The tape casting machine produces a final cast tape whose transverse density is controllable according to parameters established in the tape casting machine. Most preferably, the density is uniform across the width of the cast tape, but it may instead be controllably varied.

In accordance with the invention, a tape casting machine comprises a casting base lying generally in a horizontal plane and having a feed location, and a casting head positioned to dispense a flowable material onto the casting base. The casting base and the casting head are movable relative to each other. The casting base typically comprises a support block having an upper surface, a carrier film, and a film transport that moves the carrier film across the upper surface of the support block below the casting head. The casting head comprises a reservoir containing the flowable material, and a doctor blade extending across a transverse width and having a lower margin disposed adjacent to but not contacting the casting base such that flowable material exits from the reservoir to the feed location of the casting base between the lower margin of the doctor blade and the casting base to form a cast tape. The lower margin includes a lower leading margin adjacent to the reservoir and a lower trailing margin remote from the reservoir. The lower trailing margin of the doctor blade has a curvature in at least one of the horizontal plane and a vertical plane perpendicular to the horizontal plane. Preferably, a heater is positioned downstream of the casting head to heat the tape cast onto the casting base.

In one form, the lower trailing margin of the doctor blade is curved in the horizontal plane. A width of the doctor blade between the lower leading margin and the lower trailing margin is greater at a transverse edge of the doctor blade than at a transverse centerline of the doctor blade, most preferably by an amount of from about $6.9 \times 10^{-4}$ to about $38 \times 10^{-4}$ inches per inch of transverse width.

In another form, the lower trailing margin of the doctor blade is concavely curved in the vertical plane relative to the casting base. The lower trailing margin is further from the casting base at a transverse centerline of the doctor blade than at a transverse edge of the doctor blade. A distance from the casting base to the lower trailing margin of the doctor blade in the vertical plane is greater at a transverse centerline of the doctor blade than at a transverse edge of the doctor blade, most preferably by an amount of from about $7.7 \times 10^{-6}$ to about $76.9 \times 10^{-6}$ inches per inch of transverse width.

In one embodiment, the casting base comprises a support block having an upper surface, a carrier film, and a film transport that moves the carrier film in a transport direction across the upper surface of the support block below the casting head. The casting head dispenses the slurry onto the moving carrier film. The casting head includes the doctor blade having the lower leading margin contacting the flowable material, which is preferably a slurry, in the reservoir and disposed perpendicular to the transport direction and adjacent to but not contacting the carrier film. Flowable material exits from the reservoir to the feed location of the carrier base between the lower leading margin of the doctor blade and the carrier film to form the cast tape.

The vertically and/or horizontally curved doctor blade alters the distribution of material within the cast tape. The density of the material in the cast tape may be controlled according to the curvature and geometry of the doctor blade. In particular, the curvature and geometry may be selected to produce a uniform density of the cast material across the transverse width of the cast tape. (The curvature and geometry may instead be selected to produce a controllably nonuniform density of the cast material across the transverse width of the cast tape, but this structure is of less interest than the uniform-density material.) This approach is usable with otherwise-conventional tape casting apparatus. It permits the properties of the cast tape to be controlled more precisely than heretofore possible.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 6 is a sectional view of the doctor blade of FIGS. 4 and 5, taken along line 6—6 of FIG. 5;

FIG. 7 is a graph of specimen weights at the centerline and edges of a cast tape for a number of sample locations along the length of the tape, for the tape cast using a conventional doctor blade;

DETAILED DESCRIPTION OF THE INVENTION

Figure 1:
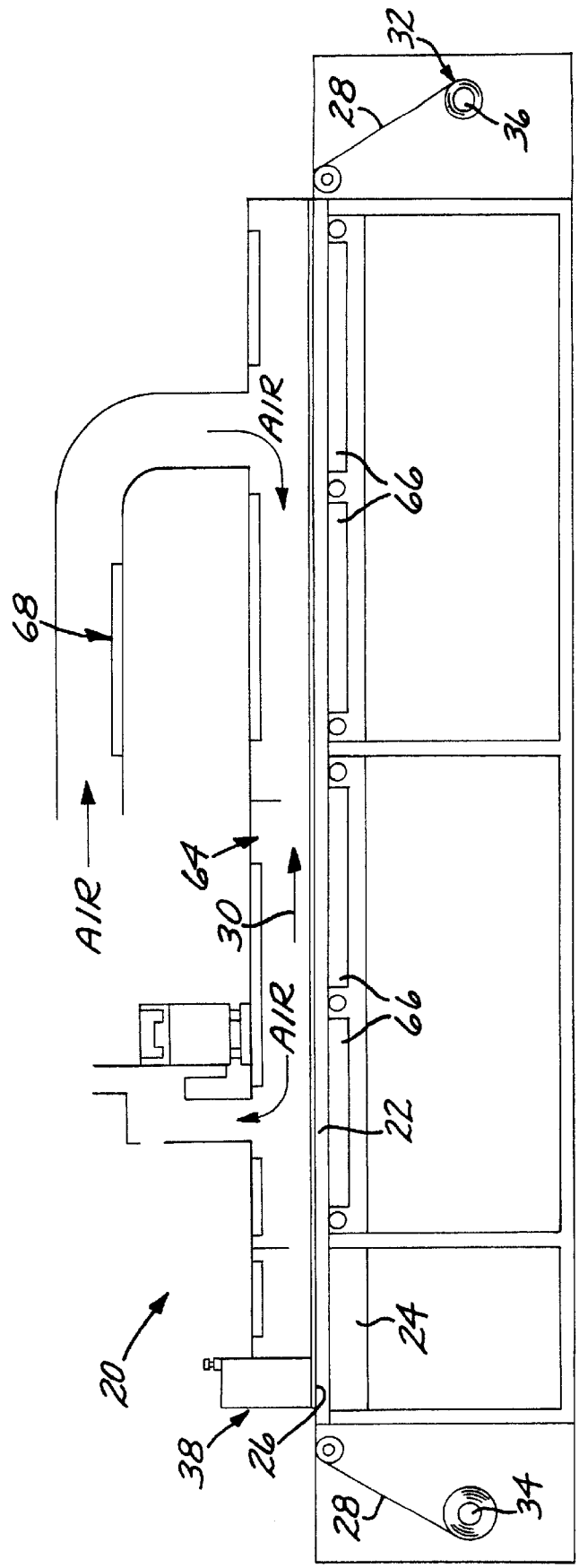
FIG. 1 is an elevational view of a tape casting machine.

FIG. 1 depicts a presently preferred form of a tape casting machine 20. Other types of tape casting machines using a doctor blade are known, and the present invention is operable with them as well.

The tape casting machine 20 has a casting base 22, which includes a support block 24 having an upper surface 26. A carrier film 28 is transported in a transport direction 30 along the upper surface 26 by a film transport 32. The film transport 32 includes a payout spool and brake 34 and a takeup spool and motor 36. A film material such as Mylar™ polymer (polyethylene terepthalate polyester) supplied from the payout spool and brake 34 is drawn along the upper surface 26 of the support block 24 by the takeup spool and motor 36. The carrier film 28 is typically moved at a rate of 20 inches per minute.

Figure 2:
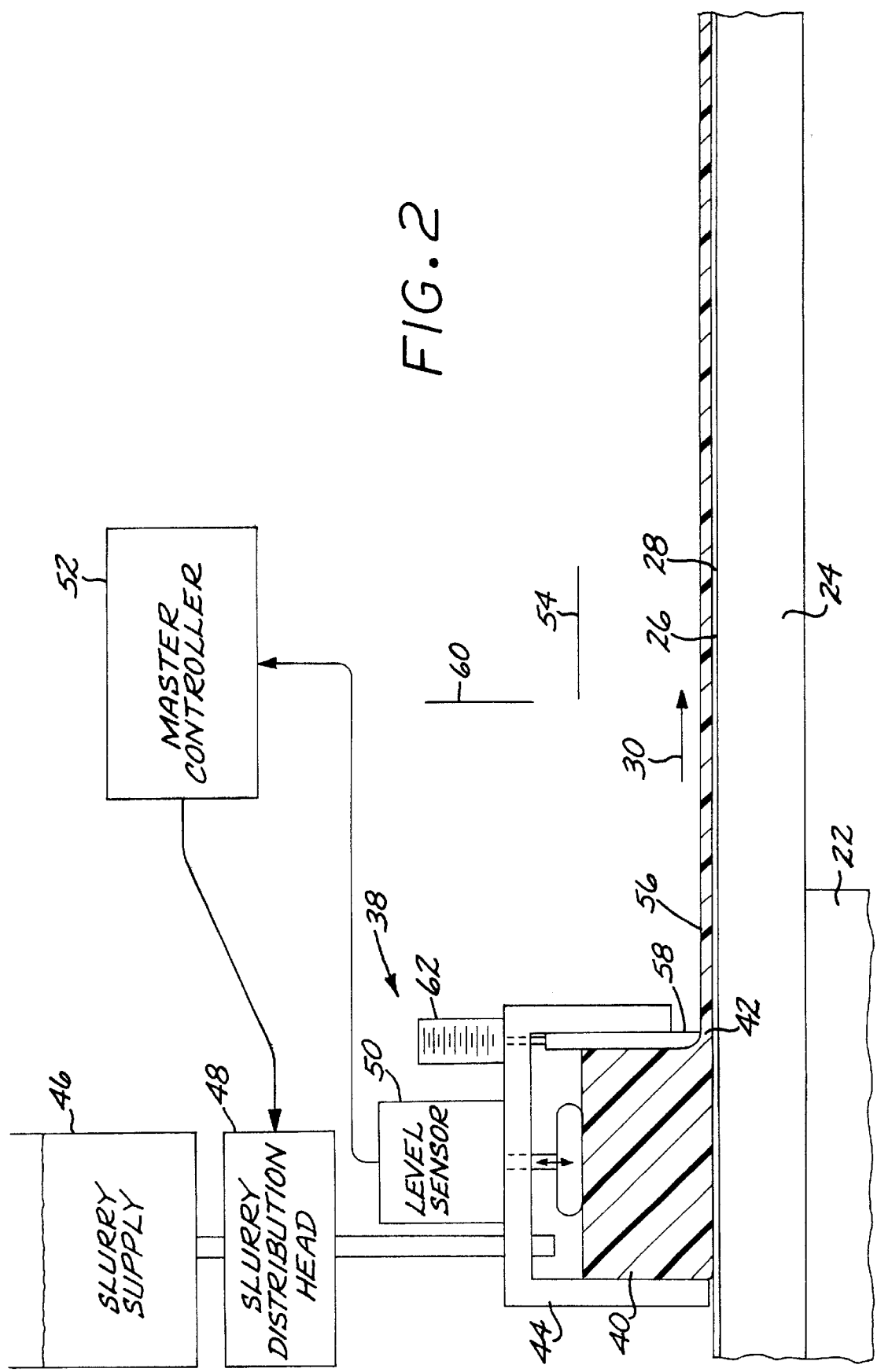
FIG. 2 is a detail of the casting head of the tape casting machine.

A casting head 38, shown in greater detail in FIG. 2, is positioned to dispense a layer of a flowable material 40 onto the casting base 22 at a feed location 42. The flowable material may comprise any operable material, with a polymer or polymer-base mixture being preferred. The present inventors are interested in preparing electrodes for batteries with this approach, but the present invention may be used in relation to many other tape-casting applications. A preferred flowable material of the present inventors is a slurry of carbon particles in a PVDF (polyvinylidene fluoride) matrix to prepare an anode and a slurry of lithium-metal-oxide particles in a PVDF matrix to prepare a cathode, with a solvent/carrier such as acetone used in both cases. The casting head 38 includes a reservoir 44 containing the flowable material 40. The flowable material 40 is supplied to the reservoir 44 from a slurry supply 46 and distribution pump head 48. The level of slurry in the reservoir 44 is sensed by a sensor 50, and a controller 52 responsively controls the flow of the distribution pump head 48 to maintain the level of slurry.

The reservoir 44 is open on the bottom. The carrier film 28 passes along the open bottom of the reservoir 44 in a horizontal plane 54. As the carrier film 28 moves, flowable slurry material 40 adheres to the surface of the carrier film 28 and is carried in the transport direction 30. The thickness of a layer 56 of the flowable material 40 that emerges from the reservoir 44 at the feed location 42 is determined by the vertical position of a doctor blade 58. The doctor blade 58 forms a portion of the side of the reservoir 44 at the feed location 42. The doctor blade 58 is movable upwardly or downwardly in a vertical plane 60 by a micrometer mechanism 62, which may be controlled manually or automatically by the controller 52. (The horizontal plane 54 is defined as the plane perpendicular to the radius of the earth, which is the direction of the pull of the earth's gravity, at that location on the earth's surface. The vertical plane 60 is a plane perpendicular to the horizontal plane 54.)

After the layer 56 of the flowable material 40 leaves the casting head 38 riding on the moving carrier film 28, the flowable material 40 and the carrier film 28 are heated to drive off the solvent from the slurry. Heating is accomplished as illustrated in FIG. 1 by passing the carrier film 28 and the layer 56 thereon through a heating tunnel 64 positioned above the carrier film 28, and by heating the carrier film 28 from below with heaters 66. (The air entering the heating tunnel 64 is preheated by air heaters 68.) The required temperature of heating varies according to the nature of the flowable material 40, but for the slurry case described above the temperature is about 100° F.

A final cast tape may be as wide and thick as required for an application. In a case of interest to the inventors, the cast tape is about 13 inches wide and from about 0.001 to about 0.010 inch thick.

One of the problems associated with conventional tape casting machines is that the density of the final processed cast tape varies across the transverse width of the cast tape. The density may be conveniently determined by cutting uniformly sized pieces from various regions of the tape and weighing them, so that for such uniformly sized pieces the weight provides a convenient surrogate measure of density. Density and weight variations will be discussed synonymously. In one case the density varies by up to about 5 percent from the transverse center to the transverse edge of the cast tape. This density variation adversely affects the product performance of the cast tape.

The present approach overcomes this problem by providing a profile to the doctor blade 58. Two different profiling techniques have been found operable. In one, illustrated in FIG. 3, the doctor blade 58a has a lower margin 70, which may be the leading or trailing margin, contacting the flowable material in the reservoir and disposed adjacent to but not contacting the casting base 22. The flowable material 40 exits from the reservoir 44 to the feed location 42 of the casting base 22 between the lower margin 70 of the doctor blade 58a and the casting base 22 to form the layer 56 of the cast tape.

Figure 3:
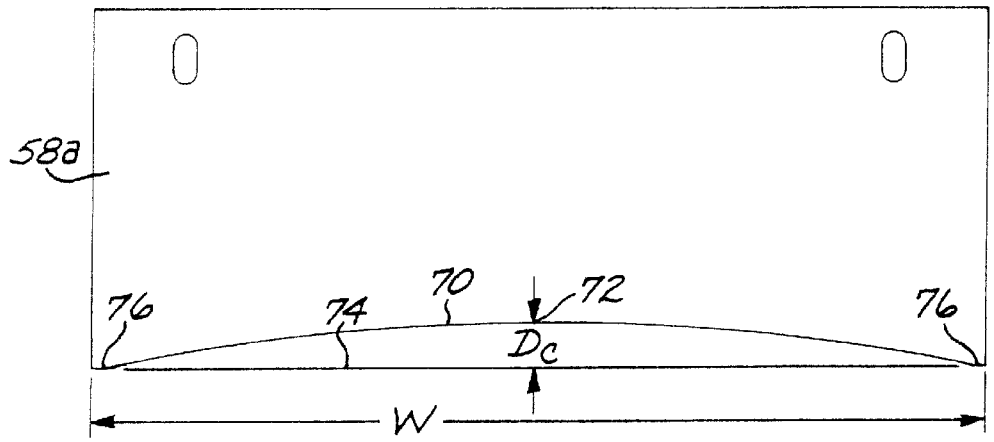
FIG. 3 is a front elevational view of a doctor blade profiled in the vertical plane.

In this embodiment of FIG. 3, the lower margin 70 of the doctor blade 58a has a curvature in the vertical plane 60 perpendicular to the horizontal plane 54. Preferably, the lower margin 70 of the doctor blade 58a has a concave curvature relative to the casting base 22. That is, a transverse centerline 72 of the lower margin 70 is spaced vertically upwardly from a datum line 74 extending between the transverse edges 76 of the doctor blade 58a by a distance $D_C$. The amount of curvature and the distance $D_C$ are exaggerated in FIG. 3 so that they may be illustrated. In a typical case, where the transverse dimension W of the doctor blade 58a is about 13 inches, $D_C$ is from about 0.0001 to about 0.001 inches, most preferably about 0.0004 inches. Stated alternatively in a normalized fashion, the distance from the casting base 22 to the lower margin 70 of the doctor blade 58a in the vertical plane is greater at the transverse centerline 72 of the doctor blade 58a than at the transverse edge 76 of the doctor blade 58a by an amount of from about $7.7 \times 10^{-6}$ to about $76.9 \times 10^{-6}$ inches per inch of transverse width, or about $30.8 \times 10^{-6}$ inches per inch of transverse width for the most preferred case. Dimensions within these limitations produce substantially uniform density across the transverse width of the cast tape, the main interest of the inventors, while dimensions outside these limitations result in transverse density variations.

Figure 4:
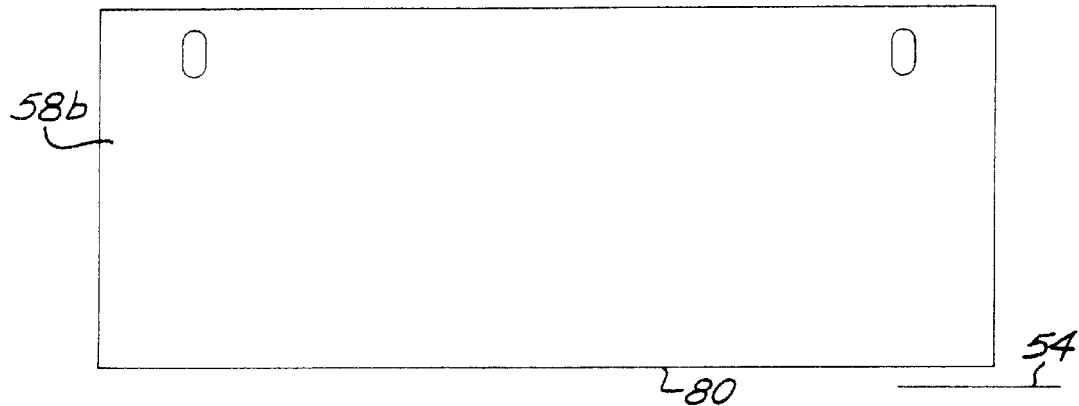
FIG. 4 is a front elevational view of a doctor blade profiled in the horizontal plane.
Figure 5:
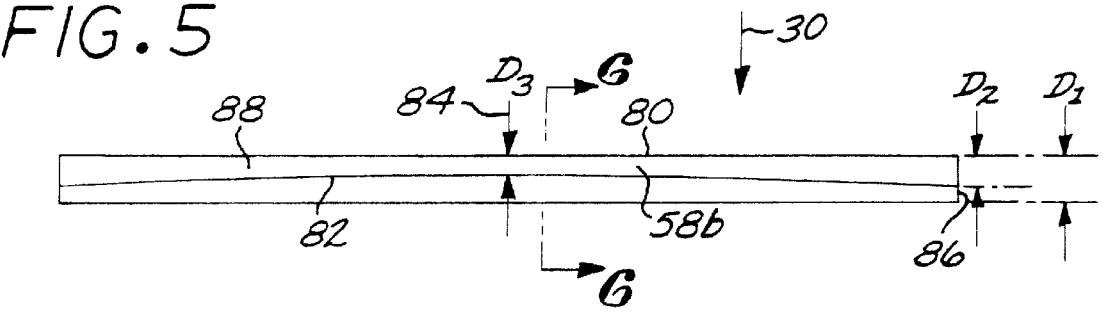
FIG. 5 is a bottom view of the doctor blade of FIG. 4, with the horizontal plane in the plane of the drawing.

In another embodiment illustrated in FIGS. 4–6, the doctor blade 58b has a lower margin (i.e., bottom side) with a lower leading margin 80 and a lower trailing margin 82. The lower trailing margin 82 of the doctor blade 58b is concavely curved in the horizontal plane 54 relative to the body of the doctor blade 58b. The amount of curvature and the distances are exaggerated in FIGS. 4–6 so that they may be illustrated. When the doctor blade 58b is assembled to the reservoir 44, the lower leading margin 80 of the doctor blade 58b faces toward the flowable material 40 in the reservoir 44. The lower trailing margin 82 is remote from the lower leading margin 80 and remote from the reservoir 44 containing the flowable material 40. In this embodiment, a width of the lower margin 88 of the doctor blade 58b between the lower leading margin 80 and the lower trailing margin 82 measured at a transverse centerline 84 of the doctor blade 58a, $D_3$ of FIG. 5, is less than the width of the lower margin 88 of the doctor blade 58b between the lower leading margin 80 and the lower trailing margin 82 measured at a transverse edge 86 of the doctor blade 58b, $D_2$ of FIG. 5. The result is that the residence time of the flowable material 44 between the lower margin 88 of the doctor blade 58b and the top surface 26 of the support block 24 is less for material flowing in the transport direction 30 near the transverse centerline 84 than for material flowing near the transverse edge 86. This shorter residence time of flowable material along the centerline than at the edge leads to less variation in the density of the final cast tape, as compared with a case where the lower leading margin and the lower trailing margin, are parallel. In a typical case for a doctor blade 58b, the transverse dimension W is 13 inches wide $D_1$ (the total width of the doctor blade) is about 0.187 inch, $D_2$ is about 0.120 inch, and $D_3$ is about 0.090 inch, so that $D_2-D_3$ is about 0.030 inch. The lower trailing margin 82 may be machined with approximately a circular curvature, but need not be exactly a segment of a circle.

Preferably, the width of the doctor blade 58b between the lower leading margin 80 and the lower trailing margin 82 is greater at the transverse edge 86 of the doctor blade 58b than at the transverse centerline 84 of the doctor blade 58b by an amount of from about 0.009 inch to about 0.050 inch, more preferably from about 0.010 inch to about 0.030 inch, for the doctor blade 58b that is about 13 inches wide. Stated alternatively in a normalized fashion, the width of the doctor blade 58b between the lower leading margin 80 and the lower trailing margin 82 is greater at the transverse edge 86 of the doctor blade 58b than at the transverse centerline 84 of the doctor blade 58b by an amount of from about $6.9 \times 10^{-4}$ to about $38 \times 10^{-4}$ inches per inch of transverse width, more preferably from about $7.7 \times 10^{-4}$ to about $23 \times 10^{-4}$ inches per inch of transverse width. Dimensions within these limitations produce substantially uniform density across the transverse width of the cast tape, the main interest of the inventors, while dimensions outside these limitations result in transverse density variations.

Combining these approaches, the doctor blade may be simultaneously curved in both the horizontal and vertical planes, with the curvatures and dimensions discussed herein and which are incorporated here.

The embodiments of FIGS. 3 and of FIGS. 4–6 both produce a controllable variation in the density of the film according to the difference in dimensions between the transverse centerline and the transverse edge of the cast tape. The approach of FIGS. 4–6 is preferred to that of FIG. 3, because the doctor blade 58b of FIGS. 4–6 is more easily machined within the limitations of conventional machining practice than the doctor blade 58a of FIG. 3. Consequently, the doctor blade 58b may be more easily produced within conventional machining tolerances.

The dimensions of the lower leading edges of the doctor blades 58a and 58b may be established to achieve a uniform density of the cast tape across its transverse width, the usual desired result. They may instead be established to achieve a controllable nonuniform density of the cast tape across its transverse width. No uniform dimensions may be stated, as they may vary according to the nature of the material being cast.

Figure 8:
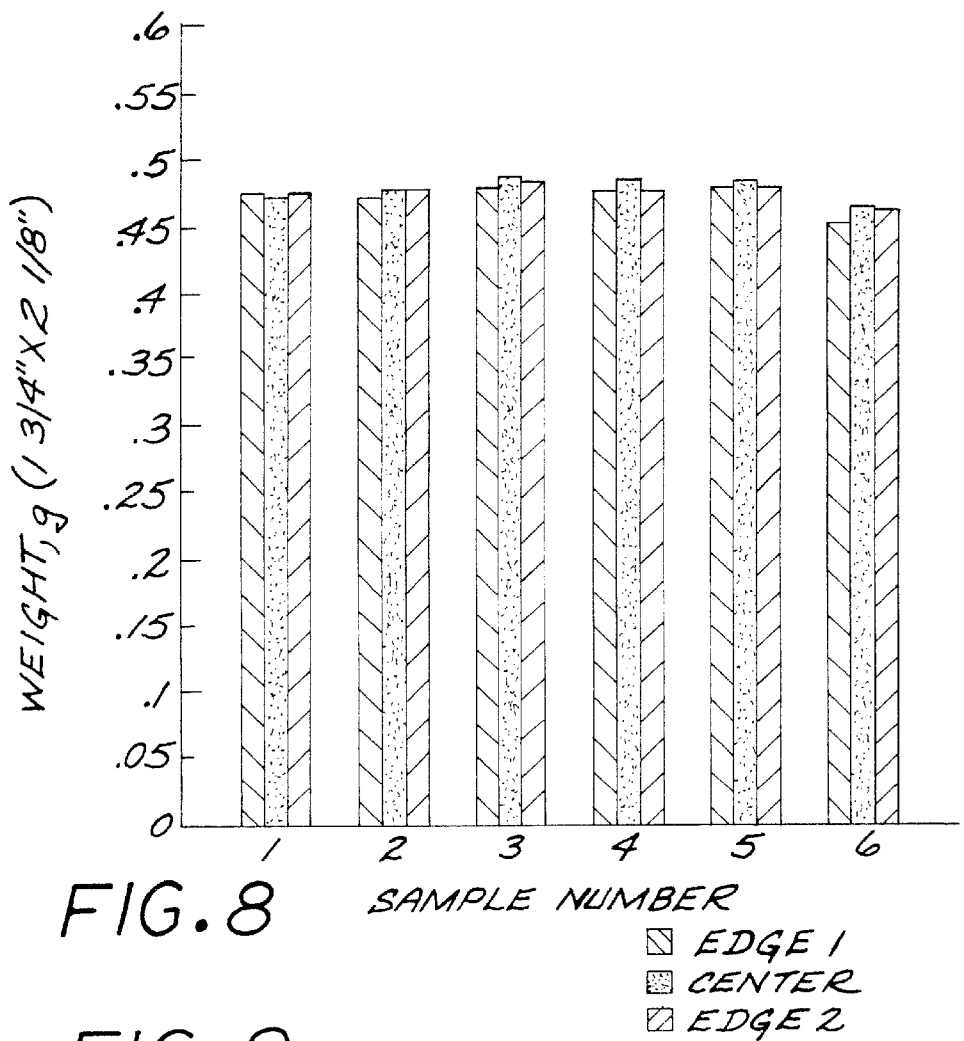
FIG. 8 is a graph of specimen weights at the centerline and edges of a cast tape for a number of sample locations along the length of the tape, for the tape cast using a vertically curved doctor blade.
Figure 9:
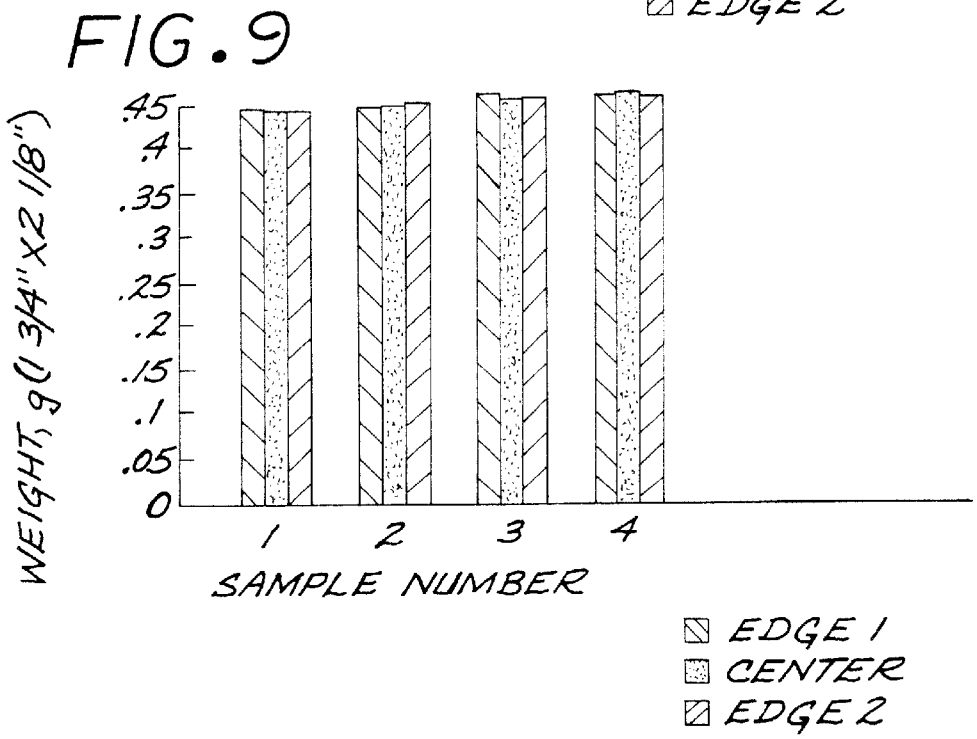
FIG. 9 is a graph of specimen weights at the centerline and edges of a cast tape for a number of sample locations along the length of the tape, for the tape cast using a horizontally curved doctor blade.

Tapes have been cast using the apparatus of FIGS. 1–2 and with a conventional uniform doctor blade (FIG. 7), the vertically curved doctor blade as discussed in relation to FIG. 3 (FIG. 8), and the horizontally curved doctor blade as discussed in relation to FIGS. 4–6 (FIG. 9). The doctor blades were all 13 inches wide. The vertically curved doctor blade of FIG. 3 had a dimensional difference between the edge and the centerline of 0.0004 inch, and the horizontally curved doctor blade of FIGS. 4–6 had ($D_2-D_3$) of 0.030 inch. The average centerline-edge deviation of samples for the conventional doctor blade (FIG. 7) was about 1.21 percent, the average centerline-edge deviation of samples for the vertically curved doctor blade (FIG. 8) was about 0.62 percent, and the average centerline-edge deviation of the samples for the horizontally curved doctor blade (FIG. 9) was about 0.57 percent. The curved doctor blades produced variations of about one-half of that of the conventional doctor blade. While the variations are small, they can be significant for the operation of batteries, and therefore the improvement of the present approach is important. The curved doctor blades whose results are reported in FIGS. 7 and 8 are not optimized, and further improvements are likely as the shapes are optimized.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tape casting machine, comprising:
   a casting base lying generally in a horizontal plane and having a feed location;
   a casting head positioned to dispense a flowable material onto the casting base, the casting base and the casting head being movable relative to each other, the casting head comprising:
   a reservoir containing the flowable material, and
   a doctor blade extending across a transverse width and having a lower margin disposed adjacent to but not contacting the casting base such that flowable material exits from the reservoir to the feed location of the casting base between the lower margin of the doctor blade and the casting base to form a cast tape, the lower margin including a lower leading margin adjacent to the reservoir and a lower trailing margin remote from the reservoir, the lower trailing margin of the doctor blade having a curvature in at least one of the horizontal plane and a vertical plane, the vertical plane being perpendicular to the horizontal plane and parallel to the transverse width.

2. The tape casting machine of claim 1, wherein the casting base comprises
   a support block having an upper surface,
   a carrier film, and
   a film transport that moves the carrier film across the upper surface of the support block below the casting head.

3. The tape casting machine of claim 1, further including
   a heater positioned to heat the tape cast onto the casting base.

4. The tape casting machine of claim 1, wherein the lower trailing margin of the doctor blade is curved in the horizontal plane.

5. The tape casting machine of claim 1, wherein a width of the doctor blade between the lower leading margin and the lower trailing margin is greater at a transverse edge of the doctor blade than at a transverse centerline of the doctor blade.

6. The tape casting machine of claim 1, wherein a width of the doctor blade between the lower leading margin and the lower trailing margin is greater at a transverse edge of the doctor blade than at a transverse centerline of the doctor blade by an amount of from about $6.9 \times 10^{-4}$ to about $38 \times 10^{-4}$ inches per inch of transverse width.

7. The tape casting machine of claim 1, wherein a distance from the casting base to the lower trailing margin of the doctor blade in the vertical plane is greater at a transverse centerline of the doctor blade than at a transverse edge of the doctor blade by an amount of from about $7.7 \times 10^{-6}$ to about $76.9 \times 10^{-6}$ inches per inch of transverse width.

8. The tape casting machine of claim 1, wherein the lower trailing margin is further from the casting base at a transverse centerline of the doctor blade than at a transverse edge of the doctor blade.

9. The tape casting machine of claim 1, wherein the lower trailing margin of the doctor blade is curved in both the horizontal plane and a vertical plane perpendicular to the horizontal plane.

10. A tape casting machine, comprising:
    a casting base lying generally in a horizontal plane and having a feed location, wherein the casting base comprises
       a support block having an upper surface,
       a carrier film, and
       a film transport that moves the carrier film in a transport direction across the upper surface of the support block below the casting head;
    a casting head positioned to dispense a slurry onto the moving carrier film, the casting head comprising
       a reservoir containing the slurry, and
       a doctor blade disposed perpendicular to the transport direction and having a lower margin adjacent to but not contacting the carrier film, such that slurry exits from the reservoir to the feed location of the casting base between the lower margin of the doctor blade and the carrier film to form a cast tape, the lower margin of the doctor blade having a concave curvature relative to the casting base in a vertical plane perpendicular to both the horizontal plane and the transport direction.

11. The tape casting machine of claim 10, further including
    a heater positioned to heat the tape cast onto the carrier film.

12. The tape casting machine of claim 10, wherein a distance from the casting base to the lower margin of the doctor blade in the vertical plane is greater at a transverse centerline of the doctor blade than at a transverse edge of the doctor blade by an amount of from about $7.7 \times 10^{-6}$ to about $76.9 \times 10^{-6}$ inches per inch of transverse width.

13. A tape casting machine, comprising:
    a casting base lying generally in a horizontal plane and having a feed location, wherein the casting base comprises
       a support block having an upper surface,
       a carrier film, and
       a film transport that moves the carrier film in a transport direction across the upper surface of the support block below the casting head;
    a casting head positioned to dispense a slurry onto the moving carrier film, the casting head comprising
       a reservoir containing the slurry, and
       a doctor blade disposed perpendicular to the transport direction and having a lower margin adjacent to but not contacting the carrier film, such that slurry exits from the reservoir to the feed location of the casting base between the lower margin of the doctor blade and the carrier film to form a cast tape, wherein a lower trailing margin of the doctor blade remote from the reservoir is convexly curved relative to the reservoir in the horizontal plane.

14. The tape casting machine of claim 13, further including
    a heater positioned to heat the tape cast onto the casting base.

15. The tape casting machine of claim 13, wherein the doctor blade further has a lower leading margin adjacent to the reservoir, and wherein a width of the doctor blade between the lower leading margin and the lower trailing margin is greater at a transverse edge of the doctor blade than at a transverse centerline of the doctor blade.

16. The tape casting machine of claim 13, wherein the doctor blade further has a lower leading margin adjacent to the reservoir, and wherein a width of the doctor blade between the lower leading margin and the lower trailing margin is greater at a transverse edge of the doctor blade than at a transverse centerline of the doctor blade by an amount of from about $6.9 \times 10^{-4}$ to about $38 \times 10^{-4}$ inches per inch of transverse width.

* * * * *